United States Patent
Sawai et al.

(10) Patent No.: US 7,087,313 B2
(45) Date of Patent: Aug. 8, 2006

(54) BIAXIALLY STRETCHED POLYLACTIC ACID MULTILAYER FILM AND THE USE THEREOF

(75) Inventors: Tohru Sawai, Ibaraki-Ken (JP); Junichi Narita, Ibaraki-Ken (JP); Hiroyuki Wakaki, Ibaraki-Ken (JP)

(73) Assignee: Tohcello Co., Ltd., Tokyo (JP)

( * ) Notice: Subject to any disclaimer, the term of this patent is extended or adjusted under 35 U.S.C. 154(b) by 0 days.

(21) Appl. No.: 11/185,981

(22) Filed: Jul. 21, 2005

(65) Prior Publication Data

US 2006/0019111 A1    Jan. 26, 2006

(30) Foreign Application Priority Data

Jul. 22, 2004    (JP)    ............... 2004-213701

(51) Int. Cl.
| | |
|---|---|
| B32B 27/08 | (2006.01) |
| B32B 27/36 | (2006.01) |
| C08G 63/06 | (2006.01) |
| C08G 63/08 | (2006.01) |
| C08G 63/16 | (2006.01) |

(52) U.S. Cl. ............... 428/480; 428/343; 428/346; 428/347; 428/349; 428/910; 525/437; 525/444; 525/450; 528/302; 528/307

(58) Field of Classification Search ............... None
See application file for complete search history.

(56) References Cited

U.S. PATENT DOCUMENTS

| | | | | |
|---|---|---|---|---|
| 5,843,573 A | * | 12/1998 | Itoh et al. ............ | 428/364 |
| 5,883,199 A | * | 3/1999 | McCarthy et al. ...... | 525/437 |
| 6,153,276 A | * | 11/2000 | Oya et al. ............ | 428/35.2 |
| 6,521,336 B1 | * | 2/2003 | Narita et al. ......... | 428/349 |
| 2002/0065345 A1 | * | 5/2002 | Narita et al. ......... | 524/271 |
| 2005/0288452 A1 | * | 12/2005 | Wakaki et al. ........ | 525/450 |

\* cited by examiner

*Primary Examiner*—Vivian Chen
(74) *Attorney, Agent, or Firm*—Westerman, Hattori, Daniels & Adrian, LLP.

(57) ABSTRACT

Disclosed is a biaxially stretched polylactic acid multilayer film and the use thereof as packaging film. The gist of the biaxially stretched polylactic acid multilayer film resides in the construction wherein a substrate layer (1) of the biaxially stretched film comprised of polylactic acid (A) has been laminated on at least one surface thereof with a coating layer (II) of an aliphatic polyester composition (D) comprised of 97~5% by weight of an aliphatic polyester copolymer (B) having a melting point (Tm) of 80~120° C., a crystallizing temperature (Tc) of 35~75° C. and a difference of (Tm)−(Tc) within the range of 35~55° C. and comprising an aliphatic or alicyclic dicarboxylic acid component (b1), an aliphatic or alicyclic dihydroxyl compound component (b2) and a difunctional aliphatic hydroxycarboxylic acid component (b3) and 3~95% by weight of a polylactic acid copolymer (C) containing 7~30% by weight of D-lactic acid, a total of the ingredients (B) and (C) being 100% by weight.

6 Claims, No Drawings

US 7,087,313 B2

BIAXIALLY STRETCHED POLYLACTIC ACID MULTILAYER FILM AND THE USE THEREOF

BACKGROUND OF THE INVENTION

1. Field of the Invention

The present invention relates to a biaxially stretched polylactic acid multilayer film useful as a packaging film, which is furnished with biodegradable property and is excellent in transparency, optical characteristics such as gloss, and low temperature heat sealability as well as the use thereof. More particularly, the present invention relates to a biaxially stretched polylactic acid multilayer film wherein a biaxially stretched film substrate is coated on at least one surface thereof with a biodegradable coating layer comprising an aliphatic polyester composition as well as the use thereof as packaging materials.

2. Description of the Prior Art

In recent years, biodegradable films have attracted public attention with a view to facilitating disposal treatment of plastic films, and as a result, various kinds of films have been developed hitherto. These biodegradable films undergo hydrolysis and/or biodegradation in soil or water, while gradually permitting decomposition and disintegration of the films, and finally these films are converted into harmless decomposition products by the aid of microorganisms. Known as such films are those made of aromatic polyester resins, aliphatic polyester resins such as polylactic acid and polybutylene succinate, polyvinyl alcohol, cellulose acetate, and starch.

A biaxially stretched film comprised of polylactic acid which is one of such biodegradable resins excels in transparency and so is commenced to use as a packaging film. However, this film is devoid of heat sealable property as such. As a means for imparting heat sealable property to biaxially stretched polylactic acid films, there are proposed (1) a biaxially stretched laminated film of polylactic acid type (JP-A-2001-219522, claim 1) manufactured by laminating one surface of a biaxially stretched film of polylactic acid with a polymer of polylactic acid series containing predominant amount of D-lactic acid and (2) a multilayer biodegradable plastic film (JP-A-8-323946, claim 1) manufactured by laminating one surface of a biaxially stretched film comprising polylactic acid with an aliphatic polyester having a low melting point such as 1,4-butanediol succinate. However, these laminated films are poor in the quality as packaging films since they are inferior in low temperature heat-sealability or optical characteristics, even if they are furnished with heat-sealability.

In the aforesaid circumstances, therefore, there is a demand for developing a novel polylactic acid multilayer film possessing not only biodegradability but also excellent transparency and gloss.

BRIEF SUMMARY OF THE INVENTION

It is an object of the present invention to provide a biaxially stretched polylactic acid multilayer film possessing excellent low temperature heat-sealability and biodegradability without damaging inherent optical characteristics of the polylactic acid film such as transparency and gloss.

It is another object of the present invention to provide a biaxially stretched multilayer film suitable for packaging use, which is made of the layers of polylactic acid and biodegradable aliphatic polyester composition.

It is still another object of the present invention to provide a multilayer film for packaging use made of a biaxially stretched film comprising polylactic acid, which carries on one surface of the substrate film with biodegradable heat-sealable polyester resin composition.

In accordance with one embodiment of the present invention, there is provided a biaxially stretched polylactic acid multilayer film wherein a substrate layer (1) of the biaxially stretched film comprised of polylactic acid (A) has been laminated on at least one surface thereof with a coating layer (II) of an aliphatic polyester composition (D) comprised of 97~5% by weight of an aliphatic polyester copolymer (B) having a melting point (Tm) of 80~120° C., a crystallizing temperature (Tc) of 35~75° C. and a difference of (Tm)–(Tc) within the range of 35~55° C. and comprising an aliphatic or alicyclic dicarboxylic acid component (b1), an aliphatic or alicyclic dihydroxyl compound component (b2) and a difunctional aliphatic hydroxycarboxylic acid component (b3) and 3~95% by weight of a polylactic acid copolymer (C) containing 7~30% by weight of D-lactic acid, a total of the ingredients (B) and (C) being 100% by weight.

In accordance with one aspect of the embodiment, there is provided an aliphatic polyester copolymer (B) wherein the content of the difunctional aliphatic hydroxycarboxylic acid component (b3) is within the range of 0.1~25 mol %, with the proviso that among the aliphatic or alicyclic dicarboxylic acid component (b1), the aliphatic or alicyclic dihydroxyl component (b2) and the difunctional aliphatic hydroxycarboxylic acid component (b3), the amounts of the aliphatic or alicyclic dicarboxylic acid component (b1) and the aliphatic or alicyclic dihydroxyl component (b2) are substantially equal and a total of the aliphatic or alicyclic dicarboxylic acid component (b1), the aliphatic or alicyclic dihydroxyl component (b2) and the difunctional aliphatic hydroxycarboxylic acid component (b3) is 100 mol %.

In accordance with another embodiment of the present invention, there is provided a biaxially stretched polylactic acid multilayer film wherein the difunctional aliphatic hydroxycarboxylic acid component (b3) is polylactic acid.

In accordance with still another embodiment of the present invention, there is provided a biaxially stretched polylactic acid multilayer film wherein a multilayer film obtained by coextruding the polylactic acid (A) and the aliphatic polyester composition (D) has been biaxially stretched.

In accordance with further embodiment of the present invention, there is provided a biaxially stretched polylactic acid multilayer film wherein the coating layer (II) has been laminated on both surfaces of the substrate layer (I) comprised of the biaxially stretched polylactic acid film (A).

In accordance with still further embodiment of the present invention, there is provided a film for use in overlapped package, which comprises the aforesaid biaxially stretched polylactic acid multilayer film.

DETAILED DESCRIPTION OF THE INVENTION

Below is a detailed description on the individual components constituting the multilayer film of the present invention.

Polylactic Acid (A)

The polylactic acid (A) constituting the substrate layer (I) of the biaxially stretched polylactic acid multilayer film is usually a homopolymer or copolymer of D-lactic acid or L-lactic acid having a D-lactic acid or L-lactic acid content of less than 5% by weight, preferably 3% by weight, and usually having a melting point within the range of 150~170° C., preferably 160~170° C.

In addition to homopolymer of D-lactic acid or L-lactic acid, such polylactic acid (A) may be a copolymer with a copolymerizable comonomer such as a 3-hydroxybutyrate, caprolactone or glycolic acid. Utilizable as the polylactic acid (A) is one usually having an MFR (load 2160 g, at a temperature of 190° C. in accordance with ASTM D-1238) of 0.1~100 g/10 minutes, preferably 1~50 g/10 minutes, and especially preferably 2~10 g/10 minutes.

Any of the polycondensation, the ring-opening polymerization and the like known conventional polymerization methods can be adopted for the production of polylactic acid (A). In case of the polycondensation, for example, L-lactic acid, D-lactic acid or a mixture thereof can directly be subjected to dehydropolycondensation to obtain polylactic acid having a desired chemical composition.

The polylactic acid (A) used in the present invention may optionally be incorporated with one or more of usually employed additives such as antioxidants, weathering-stabilizers, antistatic agents, haze-preventing agents, anti-blocking agents, slipping agents, photostabilizers, UV-absorbing agents, optical brightening agents, bactericides, nucleus agents, inorganic and organic fillers Aliphatic Polyester Copolymer (B)

The aliphatic polyester copolymer (B) used in the present invention has a melting point (Tm) of 80~120° C., preferably 80~115° C. and more preferably 80~95° C., and a crystallizing temperature (Tc) of 35~75° C., preferably 37~73° C., the difference (Tm)–(Tc) being within the range of 30~55° C., preferably 35~55° C., and is derived from the aliphatic or alicyclic dicarboxylic acid component (b1), the aliphatic or alicyclic dihydroxyl compound component (b2) and the difunctional aliphatic hydroxycarboxylic acid component (b3).

In case the aliphatic polyester copolymer (B) is used together with the under-mentioned polylactic acid copolymer (C) as the aliphatic polyester composition (D) and then used as the coating layer (II) of the biaxially stretched polylactic acid multilayer film, the aliphatic polyester copolymer (B) having melting point (Tm) of less than 80° C. is too low in melting point of the coating layer. This case causes the coating layer to be molten in the course of the thermosetting step after the biaxial stretching step, thus resulting in the production of the film poor in the optical characteristics since the molten film undergoes recrystallization on cooling to loose surface luster. In addition, the film tends to be sticky in using for packaging, thus fails to meet its performance. On the other hand, if the aliphatic polyester copolymer (B) has a melting point (Tm) exceeding 120° C., the resultant heat-sealable layer will become higher in melting point so that the film will deteriorate in heat-sealing property.

The aliphatic polyester copolymer (B) having a crystallization temperature (Tc) of less than 35° C. is too low in crystallization temperature so that even if the multilayer film (not yet stretched) containing the copolymer as coating layer is to be produced by cast molding, the film will not completely solidified at an ordinary cooling temperature (5~30° C.) so that a press mark by a nip roll or the like tends to be printed on the film. Further, the film may not readily be detached from cooling rolls so that the resultant film will be inferior in appearance.

The aliphatic polyester copolymer (B) having the difference (Tm)–(Tc) of less than 30° C. will afford the resultant biaxially stretched polylactic acid multilayer film possessing poor transparency and heat-sealable property (especially, heat-seal strength)

In the aliphatic polyester copolymer (B), the content of the difunctional aliphatic hydroxycarboxylic acid component (b3) is within the range of 0.1~25 mol % and more preferably 1~10 mol % [among the aliphatic or alicyclic dicarboxylic acid component (b1), the aliphatic or alicyclic dihydroxyl component (b2) and the difunctional aliphatic hydroxycarboxylic acid component (b3), the amounts of the aliphatic or alicyclic dicarboxylic acid component (b1) and the aliphatic or alicyclic dihydroxyl component (b2) are substantially equal and a total of the aliphatic or alicyclic dicarboxylic acid component (b1), the aliphatic or alicyclic dihydroxyl component (b2) and the difunctional aliphatic hydroxycarboxylic acid component (b3) is 100 mol %].

No particular limitation exists in the melt flow rate (MFR measured according to ASTM D-1238:190° C., load 2160 g) of the aliphatic polyester copolymer (B), so far as the copolymer has a film-forming capacity. Usually, however, the value of MFR is within the range of 1~100 g/10 minutes, preferably 0.2~50 g/10 minutes and especially preferably 0.5~20 g/10 minutes.

Aliphatic or Alicyclic Dicarboxylic Acid Component (b1)

No particular limitation exists in (b1) the aliphatic or alicyclic dicarboxylic acid component constituting the aliphatic polyester copolymer (B). Usually, however, the aliphatic dicarboxylic acid component is a compound having 2~10 carbon atoms (including the carbon atoms in the carboxyl groups), preferably 4~6 carbon atoms. The compound may be linear or branched. In case of the alicyclic dicarboxylic acid component, however, the component has usually 7~10 carbon atoms, especially 8 carbon atoms.

So far as the aliphatic or alicyclic dicarboxylic acid component (b1) contains an aliphatic dicarboxylic acid having 2~10 carbon atoms as a predominant ingredient thereof, the component (b1) may contain the dicarboxylic acid component having a larger number of carbon atoms, for example, up to 30 carbon atoms.

Illustrative of such aliphatic or alicyclic dicarboxylic acid component (b1) are, for example, dicarboxylic acids such as oxalic acid, malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexandecarboxylic acid, 1,3-cyclohexanedicarboxylic acid, diglycolic acid, itaconic acid, maleic acid, and 2,5-norbornanedicaboxylic acid and ester derivatives of these dicarboxylic acids such as dimethyl ester, diethyl ester, di-n-propyl ester, diisopropyl ester, di-n-butyl ester, diisobutyl ester, di-tert-butyl ester, di-n-pentyl ester, diisopentyl ester, and di-n-hexyl ester.

These aliphatic or alicyclic dicarboxylic acids and ester derivatives thereof can be used singly or in mixture of at least two.

In particular, the aliphatic or alicyclic dicarboxylic acid component (b1) is preferably succinic acid, an alkyl ester thereof or a mixture thereof. In order to obtain the aliphatic polyester copolymer (B) having a low melting point ($T_m$), succinic acid may be used as a main component while using adipic acid as a subsidiary component.

Aliphatic or Alicyclic Dihydroxyl Compound Component (b2)

No particular limitation exists in the aliphatic or alicyclic dihydroxyl compound component (b2) constituting the aliphatic polyester copolymer (B). Usually, however, the aliphatic dihydroxyl compound component is a linear or branched dihydroxyl compound having 2~12 carbon atoms, preferably 4~6 carbon atoms while the alicyclic dihydroxyl compound component is a cyclic compound having 5~10 carbon atoms.

Illustrative of the aliphatic or alicyclic dihydroxyl compound component (b2) are, for example, diols or glycols such as ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propane-diol and 2,2,4-trimethyl-1,6-hexanediol; polyoxyalkylene glycol such as diethylene glycol, triethylene glycol and polyoxyethylene glycol; and polytetrahydrofuran. Especially mentioned are ethylene glycol, 1,3-propanediol, 1,4-butanediol, 2,2-dimethyl-1,3-propanediol (nepentyl glycol), cyclopentanediol, 1,4-cyclohexanediol, 1,4-cyclohexanedimethanol, and 2,2,4,4-tetramethyl-1,3-cyclobutanediol. Also mentioned are diethylene glycol, triethylene glycol, polyethylene glycol, a mixture of these and a glycol having a different number of the ether unit. Further, a mixture of different aliphatic or alicyclic dihydroxyl compounds may also be used.

1,4-butanediol is preferable as (b2) aliphatic or alicyclic dihydroxyl compound component.

Difunctional Aliphatic Hydroxycarboxylic Acid Component (b3)

No particular limitation exists in the difunctional aliphatic hydroxycarboxylic acid component (b3) constituting the aliphatic polyester copolymer (B). Usually, however, the difunctional aliphatic hydroxycarboxylic acid copolymer (b3) is a compound having linear or branched bivalent aliphatic group having 1~10 carbon atoms.

Illustrative of such difunctional aliphatic hydroxycarboxylic acid component (b3) are, for example, glycolic acid, L-lactic acid, D-lactic acid, D,L-lactic acid, 2-methyllactic acid, 3-hydroxybuturic acid, 4-hydroxybuturic acid, 2-hydroxy-n-butyric acid, 2-hydroxy-3,3-dimethylbutyric acid, 2-hydroxy-2-methylbutyric acid, 2-hydroxy-3-methylbutyric acid, hydroxypivalic acid, hydroxyisocaproic acid, and hydroxycaproic acid as well as ester derivatives of these difunctional hydroxycarboxylic acids such as methyl ester, ethyl ester, propyl ester, butyl ester, and cyclohexyl ester.

The aliphatic polyester copolymer (B) used in the present invention can be prepared according to various known polycondensation processes. More precisely, the processes are disclosed, for example, in JP-A-8-239461 and JP-A-9-272789. A part of the aliphatic polyester copolymers (B) used in the present invention is commercially available from Mitsubishi Chemical Corporation (Japan) under the trade name of GS Pla.

Polylactic Acid Copolymer (C)

The polylactic acid copolymer (C) used in the present invention is a copolymer of D-lactic acid and L-lactic acid containing 7~30% by weight, preferably 8~25% by weight of D-lactic acid.

The copolymer containing less than 7% by weight of D-lactic acid will tend to damage low temperature heat-sealable property of the resultant biaxially stretched polylactic acid multilayer film. On the other hand, the copolymer containing D-lactic acid exceeding 30% by weight will tend to afford the film inferior in molding property.

By the way, the polylactic acid copolymer (C) is analized by gas chromatography using CP Cyclodex B 236B to determine the content of D-lactic acid.

The polylactic acid copolymer (C) preferably has a glass transition temperature (Tg) of less than 58° C. and more preferably within the range of 50~57.5° C.

No particular limitation exists in the weight average molecular weight of the polylactic acid copolymer (C) so far as the copolymer has a film-forming capacity. Usually, however, the value of MFR (measured according to ASTM D-1238:load 2160 g, temperature 190° C.) is 0.1~100 g/10 minutes, preferably 1~50 g/10 minutes, and especially preferably 2~10 g/10 minutes.

Aliphatic Polyester Composition (D)

The aliphatic polyester composition (D) constituting the coating layer (II) of the biaxially stretched polylactic acid multilayer film comprises 97~5% by weight, preferably 95~25% by weight and especially preferably 95~55% by weight of the aliphatic polyester copolymer 3~95% by weight, preferably 5~75% by weight, and especially preferably 5~45% by weight of the polylactic acid copolymer (C) [the total of the aliphatic polyester copolymer (B) and the polylactic acid copolymer (C) is 100% by weight].

If the aliphatic polyester composition containing less than 3% by weight of the polylactic acid copolymer (C) is used for the coating layer (II) of the biaxially stretched polylactic acid multilayer film, adhesion of the composition to the substrate layer (I) will become inferior so that satisfactory heat-seal strength will not be expected. On the other hand, if the aliphatic polyester composition containing more than 95% by weight of the polylactic acid copolymer (C) is used for the coating layer (II) of the biaxially stretched polylactic acid multilayer film, low temperature hat-sealability and heat-seal strength of the film will not be improved.

The use of the aliphatic polyester composition (D) containing 5~45% by weight of the polylactic acid for the coating layer (II) is especially preferable since it affords the biaxially stretched polylactic acid multilayer film particularly excellent in transparency, gloss, low temperature heat-sealability and heat-seal strength.

The aliphatic polyester composition (D) is obtained by mixing the aliphatic polyester copolymer (B) with the polylactic acid copolymer within the aforesaid proportion by the aid of Henshell mixer, V-blender, a ribbon blender, a tumbler mixer or the like, or alternatively, further melt-kneading the mixture by the aid of a monoaxial extruder, a multiaxial extruder, Banbury mixer or the like after the mixing.

The aliphatic polyester composition (D) may be incorporated with usually employed antioxidants, weathering stabilizers, antistatic agents, haze-preventing agents, anti-blocking agents, slipping agents, photo-stabilizers, UV-absorbing agents, fluorescent brightening agents, bactericides, nucleus agents, inorganic and organic fillers, if necessary, separately from the aliphatic polyester copolymer (B) and the polylactic acid copolymer, so far as the object of the present invention is not damaged.

Biaxially Stretched Polylactic Acid Multilayer Film

The biaxially stretched polylactic acid multilayer film used in the present invention is a biaxially stretched multilayer film wherein the biaxially stretched substrate film (I) is coated on at least one surface thereof with the coating layer (II) comprising the aliphatic polyester composition (D). Since the biaxially stretched polylactic acid multilayer film employs polylactic acid (A) as the substrate layer (I), the resultant biaxially stretched polylactic acid multilayer film is excellent in optical characteristics such as transparency, gloss, etc. and rigidity. In addition, the low temperature heat-sealable property is imparted to the multilayer film without damaging the optical characteristics of the substrate layer (I) as the coating layer (II) derived from the aliphatic polyester composition (D) exists on the surface of the film.

The thickness of the substrate layer (I) and the coating layer (II) of the biaxially stretched polylactic acid multilayer film of the present invention may be determined according to the intended use. Usually, however, the thickness of the substrate layer (I) is within the range of 5~500 μm, preferably 10~200 μm, while the coating layer (II) is within the range of 0.1~5 μm, preferably 0.3~2 μm. A total thickness of the biaxially stretched polylactic acid multilayer film is within the range of 5~500 μm, preferably 10~200 μm.

The biaxially stretched polylactic acid multilayer film of the present invention can be manufactured by various known methods; for example, the polylactic acid (A) used as the substrate layer (I) and the aliphatic polyester composition (D) used as the coating layer (II) are coextrusion-molded to form a multilayer film, and the film is subjected to a known concurrent biaxially stretching method or a known successive biaxially stretching method.

The condition for biaxially stretching is a condition capable of stretching the polylactic acid (A); in case of the successive biaxially stretching method, for example, the ranges of the longitudinal stretching temperature and the stretching ratio are within 60 ~100° C., and 2~6 times, respectively, while those of the lateral stretching temperature and the stretching ratio are within 60~120° C., and 2~12 times, respectively. In case of the concurrent biaxially stretching method, for example, the ranges of the stretching temperature and the stretching ratio are within 60~120° C. and 2~12 times (4~150 times as area ratio), respectively. After the biaxial stretching treatment, the biaxially stretched polylactic acid multilayer film is subjected, according to the intended use, to thermosetting treatment under various conditions, whereby the thermoshrinking rate of the resultant biaxially stretched polylactic acid multilayer film can be controlled to any desired range; for example, the thermoshrinking rate of the film in longitudinal direction can be adjusted to 1~15% while that in lateral direction to 5~10% under the condition of 80° C. and 15 minutes. Likewise, the thermoshrinking rate of the film in longitudinal direction can be adjusted to 5~15%, while that in lateral direction to 10~20% under the condition of 100° C. 15 minutes.

In order to obtain a thermoshrinking film, such thermosetting treatment is not carried out or the film is maintained at the stretching temperature or below, for example, the thermoshrinking rate of the film in longitudinal direction can be adjusted to 5~10% while that in lateral direction to 10~15% under the condition of 80° C. and 15 minutes. Further, the thermoshrinking rate of the film in longitudinal direction can be adjusted to 20~70% while that in lateral direction to 20~70% under the condition of 100° C. and 15 minutes.

As a method for manufacturing the biaxially stretched polylactic acid multilayer film wherein the coextruded multilayer sheet is not stretched, the polylactic acid (A) is previously subjected to the above-mentioned method to form a biaxially stretched film followed by extrusion coating of the aliphatic polyester composition (D) on at least one surface of the resultant biaxially stretched film substrate layer (I) [the extrusion laminating method]. Or alternatively, a film is previously obtained from the aliphatic polyester composition (D) and then the film is laminated on the substrate layer (I) of the biaxially stretched film [the laminating method]. In comparison with the extrusion laminating method, however, the method for biaxially stretching coextrusion-molded sheet is performed in only one step and so is costless. As compared with the laminating method, the method using the coextrusion-molded sheet is smaller in the number of processing steps and is preferable since the heat-sealed layer may become thin to the degree that the thickness is 0.5~2 μm.

Film for Overlapping Package

A film for overlapping package comprises a biaxially stretched polylactic acid multilayer film wherein the coating layers (II) exist on both surface of the substrate layer (I).

The film for overlapping package wherein polylactic acid (A) is used as the substrate layer (I) is excellent in optical characteristics such as transparency and gloss and also in rigidity. In addition, the film is provided on both sides thereof with the coating layers (II) derived from the aliphatic polyester composition (D) so that the film is excellent in low temperature heat-sealing property and heat-sealing strength on both surfaces without damaging optical characteristics, thus being suited for overlapping package.

EXAMPLES

The present invention will now be illustrated in more detail by way of Examples, but it is to be construed that the present invention is not limited by these Examples unless the gist thereof oversteps.

The starting materials employed in Examples and Comparative Examples are as defined below.

(1) Polylactic acid (A-1):
Content of D-lactic acid:1.9% by weight, MFR (temperature 190° C., load 2160 g):6.7 g/10 minutes, Melting point (Tm):168.0° C., Glass transition temperature (Tg):59.8° C. Density:1.3 g/cm$^3$.

(2) Aliphatic polyester copolymer:

(i) Succinic acid/1,4-butanediol/lactic acid terpolymer (B-1):
Prepared by Mitsubishi Chemical Corporation (Japan), Trade Name:GS-Pla AZ 91T, MFR (190° C., load 2160 g):4.5 g/10 minutes, Melting point (Tm):108.9° C., Crystallizing temperature (Tc):68.0° C., (Tm)–(Tc):40.9° C., Density:1.3 (1.25) g/cm$^3$.

(ii) Succinic acid/1,4-butanediol copolymer (E-1):
Prepared by SHOWA HIGHPOLYMER CO., LTD. (Japan), Trade Name:BIONOLLE #1001, MFR (190° C., load 2160 g):1.5 g/10 minutes, Melting point (Tm):112.6° C., Crystallizing temperature (Tc):86.8° C., (Tm)–(Tc):17.7° C., Density:1.3 (1.26) g/cm$^3$.

(3) Polylactic acid copolymer C-1):
Content of D-lactic acid:12.6% by weight, MFR (190° C., load 2160 g):2.6 g/10 minutes, Melting point (Tm):none, Glass transition temperature (Tg):56.9° C., Density:1.3 g/cm$^3$:

In the present invention, the methods for measuring the various physical properties are as follows:

(1) Optical characteristics:
Using a Haze meter (Model 300A) manufactured by NIPPON DENSHOKU INDUSTRIES CO., LTD. (Japan), haze (HZ:%), parallel light transmittance (PT:%) and gloss (%) of film samples were measured. The measured value was an average value of the data obtained by repeated five tests.

(2) Tensile test:
Test pieces in the form of a film strip (length:150 mm; width:15 mm) were cut out in vertical direction (MD) and in lateral direction (TD) from the biaxially stretched polylactic acid multilayer film and used for the test. Using a tensile tester (Tensilon universal tester manufactured by ORIENTEC CO., LTD. Japan, Model No. RTC-1225), a tensile test was carried out under the testing conditions of chuck distance:100 mm and a cross-head speed of 300 mm/minute (in case of measuring Young's modulus of elasticity, however, 5 mm/minute) thereby obtaining strength (MPa), elongation (%) and Young's modulus of elasticity (MPa) of the test pieces at fracture point. The amount of change in the chuck distance was deemed as change in the elongation (%). The measured value was an average value of the data obtained by the repeated five tests.

(3) Heat-seal strength:

The coating layers of the biaxially stretched polylactic acid multilayer films were overlaid in face-to-face fashion and then put between biaxially stretched polyethylene terephthalate films having a thickness of 12 μm (Trade name:Lumirror manufactured by Toray Industries, Inc., Japan). Using a heat-seal tester (Model No. TP-701-B HEATSEALTESTER manufactured by Tester Sangyo Co., Japan), the films were heat-sealed under the conditions of a given temperature, a sealing surface pressure of 1 kg/cm$^2$ and a time of 0.5 second. By the way, heating was carried out only on the upper side of the films. A test sample having a width of 15 mm was cut out from the heat-sealed biaxially stretched polylactic acid multilayer film. Using a tensile tester (Tensilon universal tester manufactured by ORIENTEC CO., LTD., Japan, Model No. RTC-1225), the laminated film was peeled off at a tensile velocity of 300 mm/minute, whereby the maximum strength was obtained as heat-seal strength (in terms of N/15 mm).

EXAMPLE 1

<Preparation of the Aliphatic Polyester Composition (D-1)

The aforesaid succinic acid/1,4-butainediol/lactic acid terpolymer (B-1)and the aforesaid polylactic acid copolymer (C-1) were weighed in a ratio of 90:10 (% by weight) as the aliphatic polyester composition for the coating layer. To 100 parts by weight of this mixture was added 0.1 part by weight of silica having an average particle size of 3 μm (trade name:Sylysia 730 manufactured by Fuji Sylysia Chemical Ltd.). Using a uniaxial extruder of 40 mm φ, the mixture was melt-kneaded at 180° C. to prepare the aliphatic polyester composition (D-1).

<Preparation of an Non-stretched Multilayer Sheet

Using a uniaxial extruder of 60 mm φ for the substrate layer (intermediate layer) and two uniaxial extruders of 30 mm φ for the coating layers (both surface layers) the tips of which were provided with T-dies of multimanifold type, the polylactic acid (A-1) as a resin for the substrate layer and the aliphatic polyester composition (D-1) as a resin for the coating layer were used and molten at 190° C., respectively. Extrusion amounts of the molten resins are adjusted so that the ratio of the coating layer (II)/the substrate layer (I)/the coating layer (II) might become 10/80/10 in thickness ratio, and thereafter molten resins were coextruded through T-dies heated at 200° C. The coextruded sheet was rapidly cooled by casting rolls maintained at 30° C. to form a non-stretched three layer sheet having a thickness of 200 μm.

<Production of a Biaxially Stretched Polylactic Acid Multilayer Film>

A sheet of 85 mm×85 mm for stretching was cut out from the aforesaid non-stretched three layer sheet. Using a pantagraph type batch biaxial stretching apparatus (Model: Laboratory Film Stretcher Type KARO IV manufactured by BRUCKNER AG), the sheet was preheated with hot air at 75° C. for 5 seconds and stretched by 3 times in longitudinal and lateral directions (concurrent biaxial stretching) at a velocity of 8 m/minute, followed by thesetting the film in an atmosphere at 180° C. and 10 seconds and immediately cooling the stretched film by the aid of a fan to obtain a biaxially stretched polylactic acid multilayer film having a thickness of 20 μm (the substrate layer:16 μm; each coating layer:2 μm).

The physical properties of the resultant biaxially stretched polylactic acid multilayer film were measured according to the aforesaid methods. The result of the measurements was shown in Table 1.

EXAMPLE 2

An operation was carried out in the same manner as described in Example 1 except that the aliphatic polyester composition (D-2) comprising (B-1):(C-1) being 80:20 (% by weight) was used in place of the aliphatic polyester composition (D-1) used in Example 1, thereby obtaining a biaxially stretched polylactic acid multilayer film. The result of the measurements of the resultant film was shown in Table 1.

COMPARATIVE EXAMPLE 1

An operation was carried out in the same manner as described in Example 1 except that the succinic acid/1,4-butanediol/lactic acid terpolymer (B-1) alone was used in place of the aliphatic polyester composition (D-1) used in Example 1, thereby obtaining a biaxially stretched polylactic acid multilayer film. The result of the measurements of the resultant film was shown in Table 1.

COMPARATIVE EXAMPLE 2

An operation was carried out in the same manner as described in Example 1 except that the polylactic acid copolymer (C-1) alone was used in place of the aliphatic polyester composition (D-1) used in Example 1, thereby obtaining a biaxially stretched polylactic acid multilayer film. The result of the measurements of the resultant film was shown in Table 1.

COMPARATIVE EXAMPLE 3

An operation was carried out in the same manner as described in Example 1 except that the aliphatic polyester composition (F-1) comprising the succinic acid/1,4-butanediol copolymer (E-1) and the polylactic acid copolymer (C-1) was used in place of the aliphatic polyester composition (D-1) used in Example 1, thereby obtaining a biaxially stretched polylactic acid multilayer film.

The result of the measurements of the resultant film was shown in Table 1.

COMPARATIVE EXAMPLE 4

An operation was carried out in the same manner as described in Comparative Example 3 except that an aliphatic polyester composition (F-2) comprising (E-1):{C-1}being 80:20 (% by weight) was used in place of the aliphatic polyester composition (F-1) used in Comparative Example 3, thereby obtaining a biaxially stretched polylactic acid multilayer film.

The result of the measurements of the resultant film was shown in the following Table 1.

TABLE 1

|  | Example 1 | Example 2 | Com. Ex. 1 | Com. Ex. 2 | Com Ex. 3 | Com. Ex. 4 |
|---|---|---|---|---|---|---|
| Composition of Coating Layer | | | | | | |
| B-1 (% by weight) | 90 | 80 | 100 | — | — | — |
| E-1 (% by weight) | — | — | — | — | 90 | 80 |
| C-1 (% by weight) | 10 | 20 | — | 100 | 10 | 20 |
| Construction | 2 | 2 | 2 | 2 | 2 | 2 |
| and thickness (μm) | 16 | 16 | 16 | 16 | 16 | 16 |
|  | 2 | 2 | 2 | 2 | 2 | 2 |
| Physical properties of film | | | | | | |
| Optical characteristics | | | | | | |
| Hz (%) | 4 | 5 | 4 | 2 | 14 | 15 |
| PT (%) | 88 | 87 | 88 | 91 | 80 | 80 |
| Gloss (%) | 86 | 87 | 88 | 91 | 80 | 80 |
| Tensile test | | | | | | |
| MD | | | | | | |
| Fracture point strength (MPa) | 110 | 107 | 107 | 108 | 104 | 105 |
| Fracture point elongation (%) | 122 | 112 | 82 | 102 | 68 | 134 |
| Young's modulus (MPa) | 2806 | 2662 | 3057 | 3109 | 2914 | 2982 |
| TD | | | | | | |
| Fracture point strength (MPa) | 102 | 103 | 120 | 105 | 108 | 108 |
| Fracture point elongation (%) | 94 | 119 | 91 | 97 | 54 | 82 |
| Young's modulus (MPa) | 2761 | 2838 | 2841 | 2908 | 2904 | 2940 |
| Heat-seal temperature (° C.) | | | | | | |
| Heat-seal 70 | 0.0 | 0.0 | 0.0 | 0.0 | 0.0 | 0.0 |
| strength 80 | 0.2 | 0.1 | 0.1 | 0.0 | 0.0 | 0.0 |
| (N/15 mm) 90 | 1.7 | 1.0 | 2.1 | 0.1 | 1.0 | 0.8 |
| 100 | 2.8 | 3.7 | 3.0 | 2.0 | 2.1 | 2.4 |
| 110 | 4.3 | 5.1 | 3.8 | 3.2 | 2.5 | 2.6 |
| 120 | 5.6 | 5.5 | 4.2 | 3.6 | 2.7 | 3.4 |

Remarks:
"Com. Ex." is an abbreviation of Comparative Example.
"Young's modulus" means Young's modulus of elasticity.

As is evident from Table 1, the biaxially stretched polylactic acid multilayer films (Examples 1 and 2) concerned with the present invention wherein the aliphatic polyester composition comprising the aliphatic polyester copolymer (B-1) and the polylactic acid copolymer (C-1) as the coating layer are excellent in the optical characteristics and are furnished with heat-sealing property.

Contrary to this, the biaxially stretched polylactic acid multilayer film (comparative Example 1) wherein the aliphatic polyester copolymer (B-1) alone is used as the coating layer is inferior in gloss and surface luster.

It is also noted that the biaxially stretched polylactic acid multilayer film (Comparative Examples 2 or 3) wherein the aliphatic polyester copolymer which is one of the components in the aliphatic polyester composition (F-1 or F-2) used as the coating layer has a crystallizing point (Tc) of 86.8° C. and (Tm)–(Tc) of 17.7° C., i.e. the values of (Tc) and (Tm)–(Tc) being outside the defined ranges, deteriorates in optical characteristics and in heat-seal strength.

INDUSTRIAL APPLICABILITY

The biaxially stretched polylactic acid multilayer film of the present invention is excellent in the optical characteristics and possesses heat-sealability so that it is utilized, for example, as packaging films or shrink packs for individual items or accumulate pack items not only for Chinese noodle, wheat noodle, buckwheat noodle, plastic cup containers for these noodles or various foods or yoghurt, custard pudding, jelly, lactic acid drinks and the like canned or bottled drink foods or seasoning but also for aerosol products, interior goods, compact disks, magnetic tapes, etc. including plastic or glass containers and bottles, such as wine or edible oil bottles. In addition to these packaging applications, the film of the present invention can also be used as cap seals for bottles, shrink labels for bottles or containers.

The film of the present invention for use in overlapping package use is excellent in transparency, gloss and rigidity and furnished on both surface thereof with heat-sealable property. In addition, the film possesses sufficient impact-resistance tolerant to transportation so that the film can suitably be used for the versatile applications where polyolefin films have hitherto been used as overlapping package, for example, for individual goods or accumulate packs of chocolate, gum, candy and the like confectionary goods, fancy goods such as cigarettes and cosmetic goods, daily necessaries or recording media such as cassette tapes, video tapes, CD, DVD and game soft.

The invention claimed is:

1. A biaxially stretched polylactic acid multilayer film wherein a substrate layer (1) of the biaxially stretched film comprised of polylactic acid (A) has been laminated on at least one surface thereof with a coating layer (II) of an aliphatic polyester composition (D) comprised of 97~5% by weight of an aliphatic polyester copolymer (B) having a melting point (Tm) of 80~120° C., a crystallizing temperature (Tc) of 35~75° C. and a difference of (Tm)–(Tc) within the range of 35~55° C. and comprising an aliphatic or alicyclic dicarboxylic acid component (b1), an aliphatic or alicyclic dihydroxyl compound component (b2) and a difunctional aliphatic hydroxycarboxylic acid component (b3) and 3~95% by weight of a polylactic acid copolymer (C) containing 7~30% by weight of D-lactic acid, a total of the ingredients (B) and (C) being 100% by weight.

2. A biaxially stretched polylactic acid multilayer film according to claim 1, wherein the aliphatic polyester copolymer (B) in which the content of the difunctional aliphatic hydroxycarboxylic acid component (b3) is within the range of 0.1~25 mol %, with the proviso that among the aliphatic or alicyclic dicarboxylic acid component (b1), the aliphatic or alicyclic dihydroxyl component (b2) and the difunctional aliphatic hydroxycarboxylic acid component (b3), the amounts of the aliphatic or alicyclic dicarboxylic acid component (b1) and the aliphatic or alicyclic dihydroxyl component (b2) are substantially equal and a total of the aliphatic or alicyclic dicarboxylic acid component (b1), the aliphatic or alicyclic dihydroxyl component (b2) and the difunctional aliphatic hydroxycarboxylic acid component (b3) is 100 mol %.

3. A biaxially stretched polylactic acid multilayer film according to claim 1 or 2, wherein the difunctional aliphatic hydroxycarboxylic acid component (b3) is polylactic acid.

4. A biaxially stretched polylactic acid multilayer film according to any one of the claim 1 or 2, wherein the multilayer film obtained by coextruding the polylactic acid (A) and the aliphatic polyester composition (D) has been biaxially stretched.

5. A biaxially stretched polylactic acid multilayer film according to any one of the claim 1 or 2, wherein the coating layer (II) has been laminated on both surfaces of the substrate layer (I) comprised of the biaxially stretched polylactic acid film (A).

6. A film for use in overlapping package, which comprises the biaxially stretched polylactic acid multilayer film according to claim 5.

* * * * *